Sept. 30, 1969    G. HEITMANN    3,469,970
PELLETIZATION OF A SPONGE IRON PRODUCED BY DIRECT REDUCTION
Filed Oct. 4, 1965
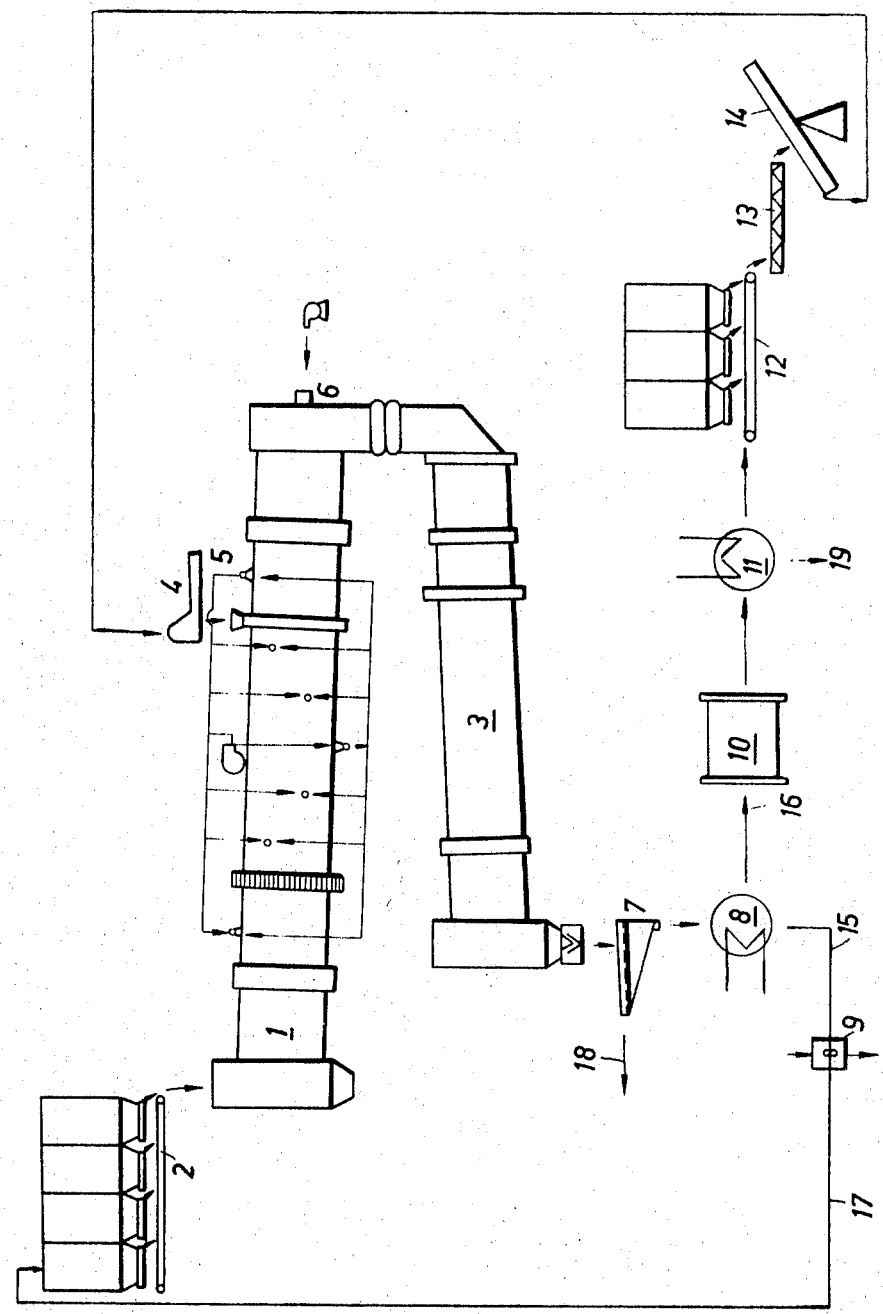
Inventor:
GÜNTER HEITMANN
BY
Bailey, Stephens & Huettig
Attorneys 3,469,970
PELLETIZATION OF A SPONGE IRON PRODUCED
BY DIRECT REDUCTION
Günter Heitmann, Frankfurt am Main-Niederrad, Germany, assignor to Metallgesellschaft Aktiengesellschaft, Frankfurt am Main, Germany, and The Steel Company of Canada Limited, Hamilton, Ontario, Canada
Filed Oct. 4, 1965, Ser. No. 492,546
Claims priority, application Germany, Oct. 8, 1964, M 62,701
Int. Cl. C21b 13/08
U.S. Cl. 75—33                            9 Claims

ABSTRACT OF THE DISCLOSURE

Lumps of sponge iron are produced by directly reducing iron ores in a rotary kiln, crushing the reduced ore, separating the crushed iron ore from the tailings, pelletizing the separated sponge, and then hardening the pellets under reducing conditions at a temperature of from 500 to 1200° C. The hardened pellets contain at least 80% metallic iron.

---

It is known to produce sponge iron lumps in a rotary kiln by reducing iron ore lumps or iron ore pellets in a bed of carbonaceous matter and, if desired, admixtures, at temperatures below the fusion temperature of the ores. This process is mainly applicable when ores having a small content of gangue are available and when it is desired to recover sponge iron which is to be used in melting furnaces, such as electric furnaces, blast furnaces, cupola furnaces or the like without intermediate treatment.

It is also known to obtain a high-grade starting product for use in a blast furnace or other melting furnaces from low-grade ores, particularly ores containing less than 60% iron, which ores cannot be enriched by flotation, sink-float processes or the like, by a process in which these ores are reduced in a rotary kiln, using coal as a reducing agent, to such an extent that their iron content is largely metallized, whereafter the reduced ore is suitably ground and the iron content is separated from the gangue by magnetic separation. This process results in a highly metallic iron powder containing only small amounts of slag impurities. This powder must be agglomerated for further use. So far, such agglomeration could only be carried out by briquetting under high pressure but this was not economically feasible because briquettes of sufficient strength can be made from fine-grained sponge iron by cold briquetting only under pressures of 4–5 tons per square centimeter.

Such high pressure cannot be applied with conventional presses, such as honeycomb presses or annular roll presses. The application of these pressures with different presses, such as cylinder presses, involves a very high wear of the press tools. Hot briquetting processes, in which a lower pressure is sufficient must be carried out under a shielding gas and with cooled presses. Both measures involve technical difficulties. Besides, owing to the elevated temperature, the wear of the press tools is not much less than in cold pressing at pressures of and above 4 tons per square centimeter.

For the further processing of the sponge iron, a certain residual carbon content in the sponge iron is often desirable. This carbon content should be sufficient for the reduction of residual oxides of iron and for adjusting a desired carbon content in the final product obtained after melting. It has been proposed to produce carbonaceous sponge iron lumps by mixing fine-grained iron ore with carbon in excess of the amount which is required for reducing the entire iron content to metallic iron, and to produce green pellets from such mixture and to reduce these pellets on a sintering conveyor. It would be possible, theoretically, to effect only part of the reduction of the pellets in a rotary kiln with the aid of the bonded carbon and to complete the reduction with the aid of an external bed of a solid carbonaceous reducing agent. In the latter case, a smaller amount of bonded carbon in the green pellets would be sufficient for obtaining a desired residual carbon content in the reduced pellets.

Both proposals have the disadvantage that the ash of the bonded coal remains in the reduced pellets so that the gangue content is undesirably increased. A large part of the sulfur which is contained in the coal remains also in the reduced pellets. This disadvantage is particularly serious when the entire amount of carbon which is required for the reduction is incorporated in the pellets.

A further disadvantage inherent in the above proposals resides in that the pellets made from the mixture of ore or ore concentrate, on the one hand, and coal, on the other hand, have a very low strength so that a considerable part of such pellets does not remain intact during their passage through the kiln. Besides, the above-mentioned processes for producing sponge iron lumps which contain bonded carbon require high-grade iron ore or concentrates thereof because these processes do not enable an elimination of waste and other slag constituents during the process itself.

It could be contemplated to admix coal to fine-grained sponge iron recovered by mechanical classification from the product obtained by relatively low-grade iron ore and to briquette the resulting mixture. In this case, however, the pressures applied would have to be even higher than for briquetting pure sponge iron powder or the strength of briquettes obtained under the same pressure would be further reduced.

The present invention relates to the production of sponge iron lumps with or without bonded carbon in a process in which the above-mentioned disadvantages are avoided and sponge iron lumps are recovered which are free of carbon or have any desired, adjustable carbon content. The invention is essentially based on the surprising discovery that shaped bodies can be made from fine-grained sponge iron virtually without application of any pressure when this sponge iron is pelletized under suitable conditions in the manner which is known for ores. Thus, pelletizing may be effected by moistening the mixture and causing the moist mixture to roll on itself, e.g., on a pelletizing plate or in a granulating drum, even though it is known that metallic iron cannot be pelletized because it has no bonding power.

Surprisingly it has been found that fine-grained sponge iron obtained by a direct reduction of iron ore in a rotary kiln, subsequent grinding and mechanical classification, tends to undergo a certain reoxidation under pelletizing conditions, particularly when moistened, and that it has during this reoxidation a bonding capacity which is entirely sufficient at least for obtaining green pellets of adequate strength and which is not substantially reduced if coal is incorporated in the pellets. The green strength may be further increased by known admixtures for increasing the green strength, such as bentonite in amounts of 0.1–3%, if this is desired. It is particularly desirable to add lime, particularly hydrate of lime, because this addition will increase the green strength as well as the final strength and is not only harmless but even beneficial in view of the end use of the product according to the invention. The addition of lime is suitably controlled so that it is sufficient for slagging the waste constituents contained in the pellets during the subsequent melting operation. It is further necessary according to the invention to subject the resulting mixed pellets of sponge iron and, if desired, coal, to a relatively short subsequent heat treatment at a temperature from 500 to 1200° C. under reducing conditions with regard to the sponge iron. The subsequent heat treatment may be carried out according to various principles and in various ways and is preferably effected by returning the green pellets into the rotary kiln in which the charged iron ore is being reduced to form sponge iron. This subsequent treatment eliminates the effect of the slight reoxidation which has taken place during pelletizing and further results in a hardening which is sufficient for the further processing of the carbon-free or carbonaceous pellets.

In a preferred embodiment of the invention, caking coal or a mixture of caking coal and other carbonaceous matter is incorporated in the pellets. The low-temperature distillation of the caking coal in the temperature range of about 350–500° C. results in a transformation of the structure of the caking coal with a considerable increase in hardness, which is largely preserved even if the optimum temperature range for hardening, which goes up to about 900° C., is exceeded by a few hundred degrees centigrade. If the resulting hardness is considered satisfactory, it is sufficient to charge the mixed pellets consisting of sponge iron and coal into the final zone of the rotary kiln, e.g. into the last one-third or one-fifth of the length thereof, and to effect the temperature rise of the length thereof, and to effect the temperature rise of the pellets only by the sensible heat of the kiln charge. The volatile constituents which are then expelled may be transferred by the draft in the kiln into the preceding reducing and preheating zones, where they may be utilized for reducing and preheating. The consumption of heat which is involved in the low-temperature distillation of the coal has the further advantage that the cooler which succeeds the rotary kiln and serves for cooling the reduced matter which is discharged is correspondingly relieved.

Another preferred step of hardening the pellets involves the fusing of the metallic iron particles. This effect is obtained to an appreciable degree only at temperatures above 900° C. and gives optimum results at about 1100–1200° C. For this hardening treatment, the pellets comprising sponge iron and, if desired, coal must be returned into the rotary kiln to a point which is sufficiently spaced from the discharge end of the kiln so that the residence time which is available is sufficient for a temperature rise of the pellets to a temperature of 900–1200° C. by an addition of further heat. This may be effected, e.g., with the aid of a central burner mounted at the discharge end of of the rotary kiln or with the aid of shell burners, through which gaseous, liquid or fuel in gaseous, liquid or powder form is introduced into the rotary kiln together with the required combustion air. Alternatively, the volatile constituents which have been expelled from any admixed coal may be burnt with the aid of supplied air to supply the heat required for this purpose.

The various strength-increasing admixtures may be used individually or in combination. Preferred are combinations of lime and caking coal or of hydrate of lime and caking coal because these combinations lead to a high green strength and a high strength of the end product without resulting in an unduly large increase of the slag-forming constituents in the end product.

In a further preferred development of the invention, ore concentrates, such as magnetite, are added to the fine-grained sponge iron before it is pelletized, in amounts of 10–50%, preferably 20–30%, based on sponge iron, to control the composition of the end product particularly as regards the contents of undesired trace elements. Desired contents of various alloying metals may be obtained by an addition of alloying admixtures, such as nickel oxide or chromium oxide. These admixtures are preferably combined with the above-described admixture of carbon and other admixtures.

A special advantage of the process according to the invention resides in that it can be incorporated in the known process of producing sponge iron from low-grade ore by direct reduction, grinding and magnetic separation. A special example of this application will now be explained more fully with reference to the flow diagram shown on the accompanying drawing.

Example 1

A rotary kiln was used which had a length of 7.85 meters and an inside diameter of 0.5 meter. A mixture of ore, coal, and sulfur-combining admixtures was charged by the feeder 2 into this rotary kiln 1. The kiln was heated by shell burners 5 and a central burner 6. The mixture had the following composition:

|  | Kg./hour |
| --- | --- |
| Ore | 120 |
| Coal | 60 |
| Limestone | 3 |
|  | 183 |

The ore was charged in a particle size of 0–15 millimeters and had the following chemical composition:

|  | Percent by weight |
| --- | --- |
| Fe | 31.2 |
| $SiO_2$ | 14.8 |
| CaO | 4.1 |
| MgO | 4.5 |
| $Al_2O_3$ | 6.5 |

The anthracite coal used as a reducing agent contained

|  | Percent by weight |
| --- | --- |
| $C_{fix}$ | 85.9 |
| Ash | 4.7 |
| Volatiles | 8.7 |

The charged coal had a particle size of 0–10 millimeters. At the same time, surplus coal which had been recirculated through conduit 17 was charged by the same feeder 2.

The mixture was reduced in the rotary kiln at a temperature up to 1100° C. The reduced product was cooled to 60° C. in the absence of air in a succeeding cooler 3. The discharged matter was fed to the screening device 7, where finished, hard-fired pellets of sponge iron were retained and removed at 18 as end product. The fine-grained material passing through the screen was classified in the magnetic separator 8 into magnetic and non-magnetic fractions. The non-magnetic fraction was charged by 15 to a float-sink separator, where coal ash, waste, lime and the like were separated.

A process of carrying out this separation is disclosed in the copending application of Koch et al., Ser. No. 485,941, filed Sept. 8, 1965.

The surplus coal which had thus been cleaned was recirculated to the feeder 2 by conduit 17.

The magnetic fraction of the discharged matter, as far as it had a particle size below 15 millimeters, was fed through 16 to a grinder 10, where it was ground in accordance with the degree of intergrowth of the charged ore. In the present case, the grinding was controlled so that the particles below 40 microns amounted to 90%. The ground material was introduced into the second magnetic separator 11 and separated into a magnetic fraction and tailings. The tailings were discharged at 19. The remaining fine-grained material consisted mainly of metallic iron and after admixing bentonite, coal and iron ore concentrate was fed by the conveyor 12 to the mixer 13, from which it was charged onto the pelletizing plate 14. 20 parts of caking coal, 20 parts of an iron ore concentrate and 0.5 part bentonite were admixed per 100 parts of sponge iron. The inclination and the speed of the pelletizing plate 14 were adjusted so that pellets of a particle size of 15–20 millimeters were discharged. They had a water content of about 11.5%. By the feeder 4, the pellets were charged into the last one-third of the length of the rotary kiln, in which they were hardened. The hardened pellets were discharged by 18 and in this example contained 84.6% total iron, 81.4% metallic iron and 6.0% $C_{fix}$.

They had a crushing strength of about 60 kilograms.

Example 2

Using the same starting ore as in Example 1, a pelletizing mixture was obtained by admixing 15 parts caking coal, 20 parts hematite concentrate and 10 parts of hydrate of lime to 100 parts of the sponge iron concentrate recovered in the second magnetic separator 11. The process was carried out as in Example 1 in other respects. The hardened iron pellets withdrawn at 18 contained 89.5% by weight total iron, 85.3% by weight of metallic iron and 0.22% $C_{fix}$.

The pellets had a crushing strength of 167 kg. per pellet.

Example 3

20 parts caking coal, 20 parts iron ore concentrate and 5 parts lime were admixed to 100 parts of the sponge iron concentrate obtained as in Examples 1 and 2 and separated from the second magnetic separator 11. The mixture was pelletized after an addition of water. When hardened at 1100° C., the pellets had a crushing strength of 174 kg. per pellet. They contained 90.0% by weight $Fe_{total}$, 87% by weight $Fe_{met.}$ and 1% by weight $C_{fix}$. The process was carried out in other respects as in Example 1.

What is claimed is:

1. A process for producing sponge iron lumps comprising directly reducing iron ore in a rotary kiln in the presence of a surplus of reducing coal to transform at least a major portion of the iron content of said ore into metallic iron, cooling the reduced iron ore, separating said reduced ore from waste, grinding the separated iron ore, recovering fine-grain sponge iron as a magnetic fraction from magnetic separation of the ground iron ore, moistening said magnetic fraction, adding a pellet strength increasing material to said magnetic fraction, pelletizing by rolling the moistened magnetic fraction to obtain pellets, and heat treating said pellets at a temperature from 500 to 1200° C. under reducing conditions with regard to the sponge iron to harden said pellets.

2. A process as in claim 1, further comprising mixing a controlled amount of carbon with said magnetic fraction before the pelletizing.

3. A process as in claim 1, further comprising heat treating said pellets in the last one-third of said rotary kiln while reducing other amounts of iron ore therein.

4. A process as in claim 1, further comprising mixing from 10 to 50% by weight of high grade iron ore based on the weight of said magnetic fraction to said magnetic fraction.

5. A process as in claim 1, further comprising adding to said magnetic fraction an alloying material selected from the class consisting of oxides of nickel, chromium, manganese, and vanadium.

6. A process as in claim 1, said material comprising hydrated lime.

7. A process as in claim 1, said material comprising 0.1 to 3.0 by weight of bentonite.

8. A process as in claim 1, further comprising mixing carbon, including caking coal to said magnetic separation in an amount such that from 2 to 10% by weight of fixed carbon is in the heat treated pellets.

9. A process as in claim 1, further comprising supplying the heat treated pellets to a steel producing furnace.

References Cited

UNITED STATES PATENTS

| | | | |
|---|---|---|---|
| 2,523,138 | 9/1950 | Oppegaard | 75—36 X |
| 2,944,884 | 7/1960 | Halvorson | 75—33 |
| 3,072,474 | 1/1963 | Atkinson et al. | 75—38 X |
| 2,807,536 | 9/1957 | O'Malley | 75—38 |
| 2,986,460 | 5/1961 | Babcock et al. | 75—44 |
| 3,326,669 | 6/1967 | Stirling | 75—5 |
| 3,353,952 | 11/1967 | Hansen | 75—5 X |

L. DEWAYNE RUTLEDGE, Primary Examiner

H. W. TARRING II, Assistant Examiner

U.S. Cl. X.R.

75—5, 38, 44